(12) United States Patent
Oberle

(10) Patent No.: US 7,884,719 B2
(45) Date of Patent: Feb. 8, 2011

(54) RADIO FREQUENCY IDENTIFICATION (RFID) TAG LAMINATION PROCESS

(75) Inventor: Robert R. Oberle, Macungie, PA (US)

(73) Assignee: RCD Technology Inc., Quakertown, PA (US)

( * ) Notice: Subject to any disclaimer, the term of this patent is extended or adjusted under 35 U.S.C. 154(b) by 591 days.

(21) Appl. No.: 11/853,692

(22) Filed: Sep. 11, 2007

(65) Prior Publication Data
US 2008/0117057 A1  May 22, 2008

Related U.S. Application Data

(60) Provisional application No. 60/866,725, filed on Nov. 21, 2006.

(51) Int. Cl.
*G08B 23/00* (2006.01)
*H01L 21/00* (2006.01)

(52) U.S. Cl. ............... 340/572.1; 438/107; 438/110; 438/112; 438/118

(58) Field of Classification Search ............... None
See application file for complete search history.

(56) References Cited

U.S. PATENT DOCUMENTS

| 6,951,596 B2 | 10/2005 | Green et al. |
| 2006/0205113 A1 | 9/2006 | Oberle |

OTHER PUBLICATIONS

International Search Report and Written Opinion for PCT/US07/81294, May 13, 2008, 7 pages.

*Primary Examiner*—Julie Lieu
(74) *Attorney, Agent, or Firm*—Fliesler Meyer LLP

(57) ABSTRACT

An antenna web can include an RFID antenna on a first side of a substrate. An adhesive can be laminated on a second side of the substrate. The antenna web can then be cut into individual segments for use in constructing an RFID label.

13 Claims, 6 Drawing Sheets

RADIO FREQUENCY IDENTIFICATION (RFID) TAG LAMINATION PROCESS

CLAIM OF PRIORITY

This application claims priority to U.S. Provisional Application No. 60/866,725 entitled "Radio Frequency Identification (RFID) Tag Lamination Process" filed Nov. 21, 2006, which is incorporated herein by reference.

BACKGROUND OF INVENTION

Radio Frequency Identification (RFID) tags are typically small objects that can be attached to or incorporated into a product. An RFID tag contains an antenna to enable it to receive and respond to radio-frequency queries from an RFID tranciever. The RFID tags are used in a host of industries for purposes such as inventory control, security, personal identification and the like.

The RFID tags can be passive or active. Active devices have their own power supply. Passive devices rely on energization from the RFID tranciever. Passive and active RFID tags can use integrated circuit chips to modulate the identification response.

The construction of RFID units can consist of the attachment of a chip module to a substrate with an antenna unit. The chip module is typically attached to the substrate with an electrically conductive adhesive and then the combined unit can be further processed after the adhesive sets.

DETAILED DESCRIPTION

An antenna web (such as a substrate with pre-fabricated antenna) can be laminated with a second layer of material prior to application of the RFID chip. This second layer may consist of release liner with a pressure sensitive adhesive or coating with a heat activated adhesive on a release liner, or other appropriate second layer. The second layer can be applied to the back face (opposite) of the antenna.

The resulting antennae web construction can be die cut in order to provide a proto-RFID label, i.e., a prefabricated RFID label without the chip. The completed RFID label can be assembled by attachment of the RFID chip through a strap or direct flip chip assembly using a laminate in line process similar to that described below or in another type of process.

Figure 1A:
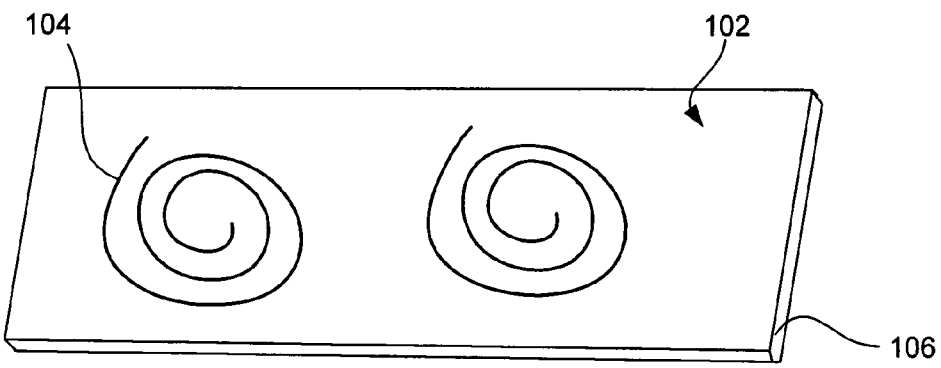
FIGS. 1A-1C shows a method of constructing an RFID tag.
Figure 1B:
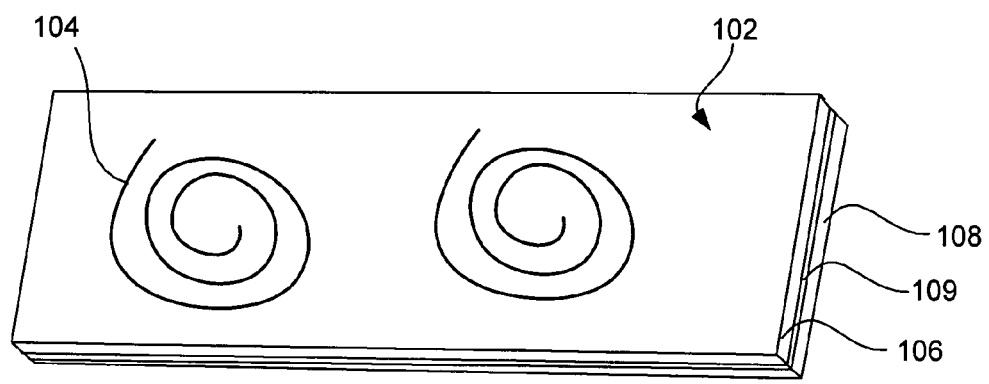

FIG. 1A shows an example of an antenna web 102 with antennas, such as antenna 104. The antenna web 102 can be any type of substrate. FIG. 1B shows the antenna web 102 attached to a pressure sensitive adhesive (PSA) 106 with release liner 108.

Figure 1C:
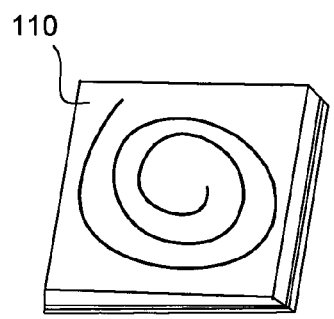

As shown in FIG. 1C, the antenna web can be die cut to produce a die cut segment 110. The die cut segments can be positioned on top of a release liner 108.

The final RFID label can include a cover with graphic placed on the die cut segments. An RFID chip can also be attached to the antenna. The RFID chip can be part of an assembly such as a strap. The assembly with RFID chip can be separate from or include the cover with graphic.

One embodiment of the present invention is a method of laminating a substrate 102 with an adhesive 109. The substrate can include an RFID antenna 104 on a first side of a substrate 102. The adhesive 109 can be laminated on a second side of the substrate 102. The substrate 102 can then be cut into individual segments 110 and 112 for use in constructing and RFID label.

An RFID chip can be attached to an antenna on a segment. The RFID chip can be attached with an adhesive. In one embodiment, the adhesive is not fully set before a cover 114 is placed over the RFID chip. The cover 114 can be printed with variable data. A cover can be put over the RFID chip on the segment. The cover can be attached to a release liner. The segments can be die cut.

One embodiment of the present invention is a unit for construction of an RFID label comprising a substrate and an RFID antenna attached to a first side of the substrate and adhesive attached to a second side of the substrate wherein the unit does not have an attached RFID chip but does have a location where the RFID chip can be attached. The RFID chip can be attached as part of a module. The adhesive can include a release liner.

Another embodiment of the laminate in line process is to use pre-processed label stock as the second laminated (over laminate). The preprocessing can consist of printing fixed or variable graphics and/or die-cutting the over laminate sections into shape prior to application to the antenna web. An advantage of this process is that variable data may be applied to the label face stock prior to assembling the face stock onto the label. The assembly of the final label or tag may be done at the point of use, through a print on demand label/tag printer, such as a Zebra.

Figure 2A:
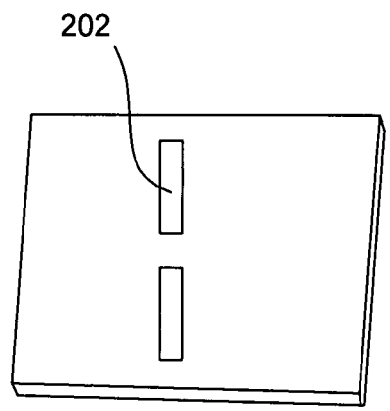
FIGS. 2A-2C shows an alternate method for constructing an RFID.
Figure 2B:
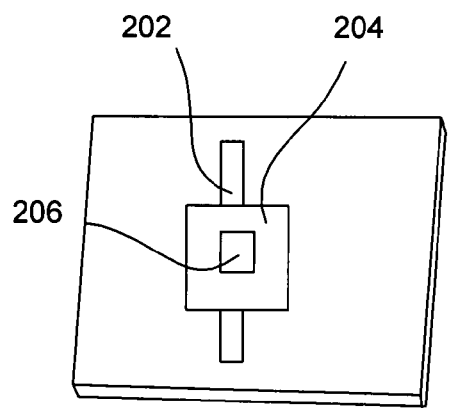
Figure 2C:
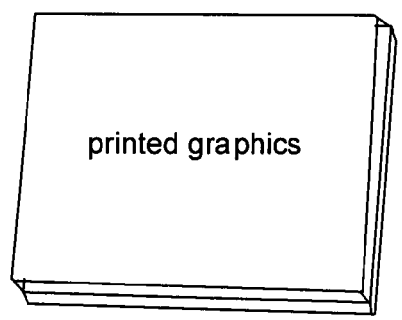

FIGS. 2A-2C shows an exemplary system. In FIG. 2A, a substrate 201 contains an antenna 202. In FIG. 2B, a strap 204 with RFID chip 206 is attached. In FIG. 2C, a cover with variable or fixed graphics is added.

One embodiment of the present invention includes printing variable data on a protective cover and thereafter, attaching the protective cover over a unit that includes a substrate and RFID antenna.

The antenna web can be laminated with an adhesive. The antenna web can include an RFID antenna on a first side of a substrate. The adhesive can be laminated on a second side of the substrate. The antenna web can be cut into individual segments for use in constructing an RFID label.

Figure 3:
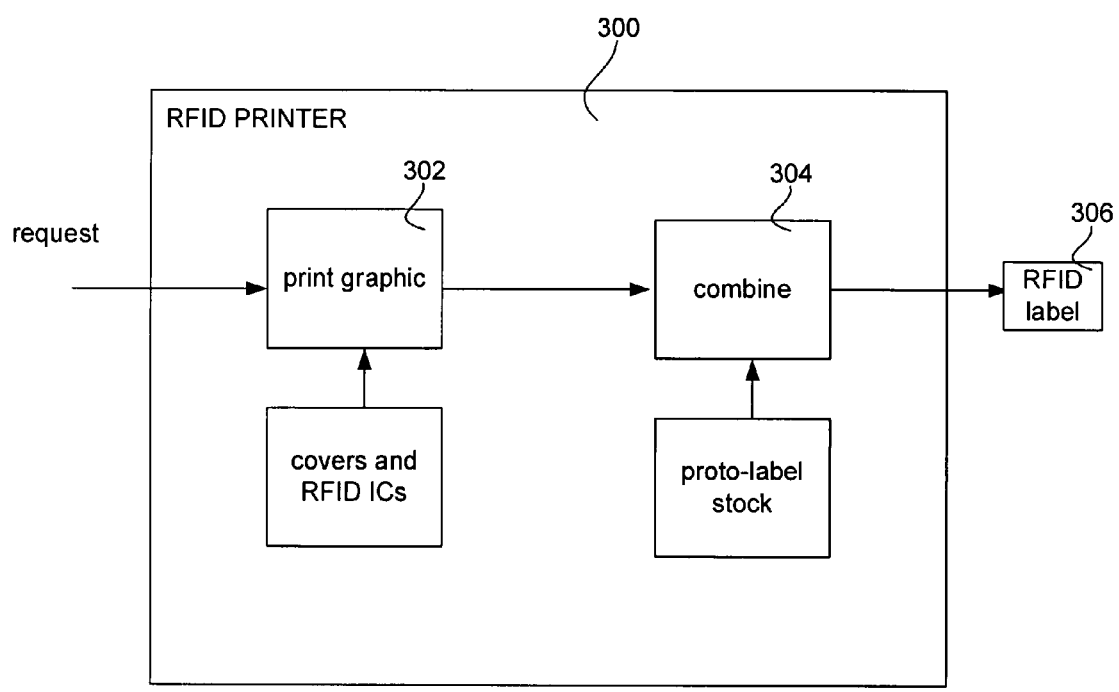
FIG. 3 illustrates an exemplary RFID label printer.

FIG. 3 shows an example of a printer 300. In this example, the printer 300 receives a request to create an RFID label. A graphic (which can indicate information about the RFID label such as titles, serial numbers, bar codes and the like) can be printed 302 on a cover. The RFID chip can be programmed at this or another time. This printed cover can then be combined 304 with the proto-label to create the RFID label 306.

Figure 4:
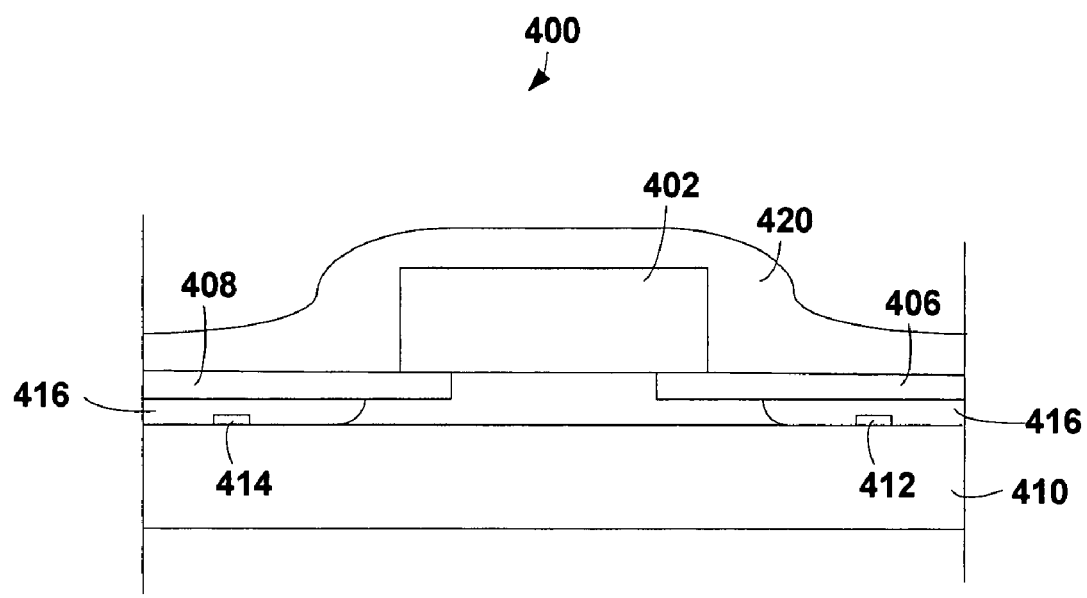
FIG. 4 is a cross sectional view of an RFID unit of one embodiment.

FIG. 4 illustrates a cross section diagram of an RFID unit 400 of one embodiment. In this embodiment, the integrated circuit 402 is part of a module 404 which also includes lead frame elements 406 and 408. Other connection elements other than a lead frame could be used in the module 404. The module 404 can be adhesively connected to substrate 410 including antenna elements 412 and 414 using a conductive adhesive 416. The conductive adhesive 416 can be a conventional isotropic conductive adhesive, and anisotropic conductive adhesive or even solder such as solder paste.

Figure 5:
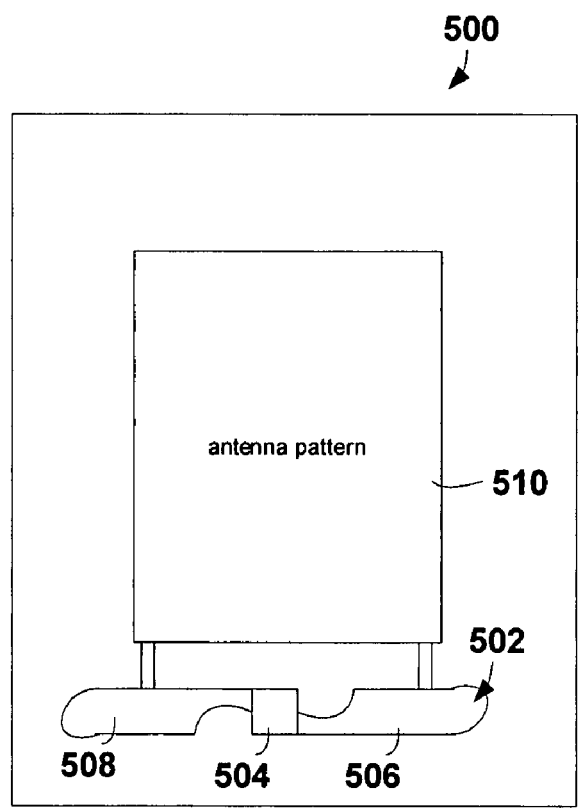
FIG. 5 is a top view of an RFID unit of one embodiment.

FIG. 5 illustrates a top view where module 502 with IC 504 and lead frame 506 and 508 are connected using the conductive adhesive to the antenna unit 510 to form the RFID unit 500.

Looking again at FIG. 4, the protective layer 420 can be laminated over the module 104 including the integrated circuit 402. The protective layer 420 can hold the module 402 in place while the conductive adhesive 416 sets.

The laminating protective layer can be made of many types of materials including thermoplastic material, thermoset material, polyester, polystyrene, polypropylene, polyethylene. The protective layer may have an adhesive layer. In one embodiment, the protective layer is relatively stretchy and will conform to the shape of the module or integrated circuit chip. In one embodiment, since the lamination is done before the adhesive is fully set, there does not have to be any dwell time between attaching and laminating steps. In one embodiment, the dwell time can be reduced below a minute. The attachment step can be done at a high rate due to the lack of requirement for the conductive adhesive to fully set. In one embodiment, the attachment is done at a rate of one attachment per second or greater. The conductive adhesive can be of such that it takes a long time to fully set since the protective layer holds the module in place. Thus, the conductive adhesive can take over a day to fully set, which can greatly increase the pot time of the adhesive in the apparatus to produce the RFID units. In one embodiment, the conductive adhesive can take over an hour to fully set.

The protective layer can have a radiation or heat curable adhesive. In one embodiment, the protective layer has an ultra violet (UV) curable adhesive that can be cured in a later step.

Figure 6:
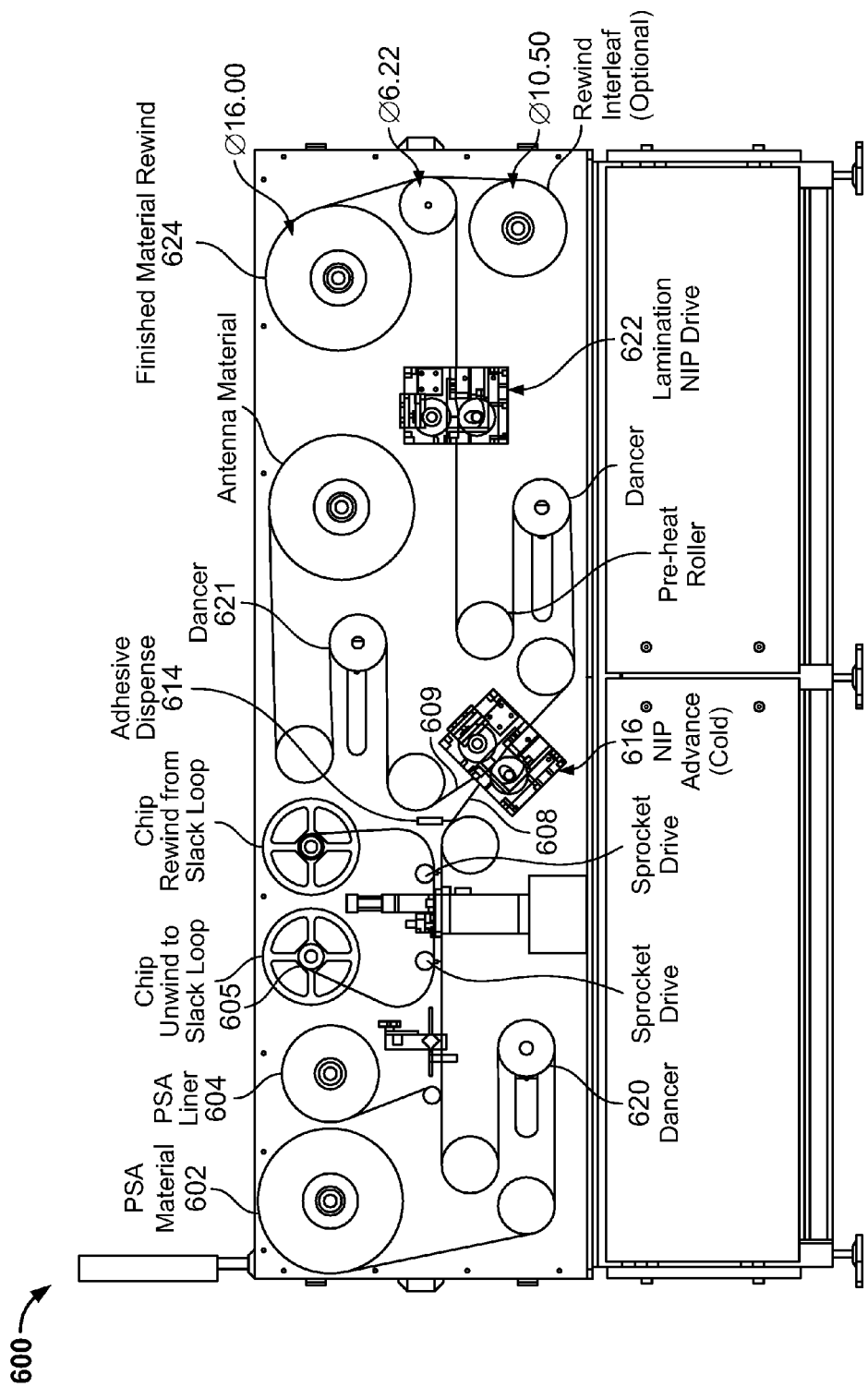
FIG. 6 is a diagram of an apparatus to construct an RFID unit of one embodiment.

FIG. 6 illustrates an apparatus of one embodiment. In this embodiment, the laminating protective layer is held in a strip on roll 602. If the protective layer has a liner it can be removed onto roll 604. A roll 605 containing a strip with chip modules can feed to device 607 which can attached the chip module up side down on the protective layer 608. The antenna material can be a strip on roll 610. The conductive adhesive can be provided by an adhesive dispenser 614 to dispense upon module, such as on the leadframe of the module. An attachment unit 616 attaches the protective layer 608 with modules to the antenna material strip 609. Dancers 620 and 621 can be used to register the substrate strip having antenna units with the modules on the protective layer 608. A lamination unit 622 can later be used to laminate the protective layer over the integrated circuit chip module. The finished material can be rolled up into a roll 324 which can be held for later processing. The later processing can include cure step which can be done at a separate location from the apparatus 600. The laminating unit 622 can use hot rollers. The attaching unit 616 can operate at a rate greater than one attachment per second or greater.

In the example of FIG. 6, the integrated circuit chip (as part of the chip module) is attached to the protective layer before the attaching unit. This need not be the case, but it can allow the chips to be spaced on a strip such that the chips will register in position with the substrate strip having the antenna unit. In an alternate embodiment, the integrated circuit chip, as part of the chip module, is attached to the substrate with antenna first followed by the lamination of the protective layer.

Figure 7A:
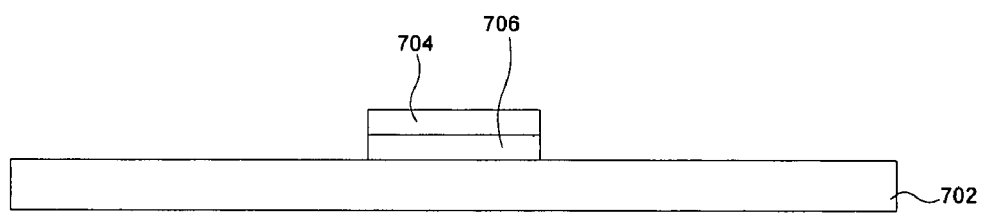
FIGS. 7A-7C shows an example of a system using liners.
Figure 7B:
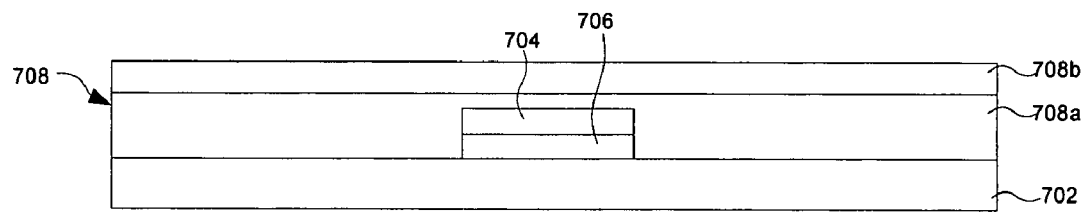
Figure 7C:
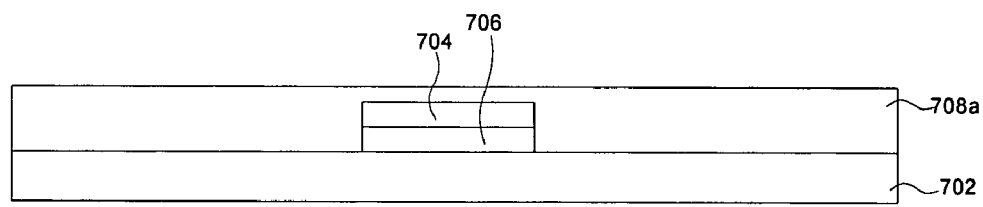

FIGS. 7A-7C shows an example of a system using liners. In FIG. 7A, an integrated circuit chip 704 is attached to a substrate 702 using adhesive 706 as shown in FIG. 7B. A protective layer 708 can be laminated over the integrated circuit chip 704 before the adhesive 706 sets. The protective layer can include a liner 708b and second adhesive 708a. The second adhesive 708a can be a thermaset, hot melt, heat activated, pressure sensitive, or other type of adhesive. The liner 708b can be removed as shown in FIG. 7C.

The protective layer can also be an uncured two-part adhesive, such as an epoxy like polyurethane. The two-part adhesive can be attached to the liner then placed over the substrate with attached IC. The two-part adhesive can then be cured to form an encapsulated RFID device, such as a credit or identification card.

The protective layer adhesive can be used to attach the unit to another element, such as a box or product for RFID tracking. In one embodiment, the unit acts as a label that can be attached to the element. There can be printed indicia, such as for the label, on one side of the substrate.

The chip module can be a single chip attached to a lead frame or suitable substrate with appropriate electrical connections for attachment to the antenna—examples of chip modules are offered by Philips Electronics, Netherlands (FCP package) and Alien Technologies of Morgan Hill Calif. (Alien Strap) The lead frame can terminates in two pads, which are intended to attach to the RFID circuit by a conductive adhesive. Chip modules can be utilized in order to alleviate the difficulties that normally arise when placing a small integrated circuits (typical integrated circuits are <1 mm square, and the areal density of integrated circuits are typically very low, <0.25 units/square inch). In traditional application, the mounting of small integrated circuits without a leadframe leads to low process throughput owing to the time delay inherent in locating and placing such a small integrated circuit.

The disadvantages of previous processes relate to process throughput and reliability. Application of non-conductive epoxy under the integrated circuit and conductive epoxy to the outer leads results in a mechanically and electrically reliable assembly, however the dwell time for the circuit, i.e. that time that the circuit must be immobilized while the adhesives cure is typically several minutes. This may be decreased by using faster curing epoxy resins however the inherent chemical instability of so-called snap cure resins makes handling difficult and leads to excessive yield loss or high material wastage. Anisotropic adhesives, either tapes or pastes offer increased throughput with respect to epoxy adhesives however the dwell time per attachment is typically several seconds and during the dwell time the module must be held immobile on the substrate using considerable pressure to effect a reliable electrical connection. The use of a laminated protective layer can produce a throughput in excess of one attachment per second that insures mechanical stability of the device. The equipment can be relatively simple to maintain a very low cost of ownership of the overall process. This can be as low as $0.01 or less per attachment when considering the overall cost of materials and equipment amortization.

In one embodiment, a traditional conductive adhesive can be placed over the terminals of the circuit to which the module is to be attached or placed on the terminals of the module prior to assembly.

The module can be placed on the substrate with contact of the terminals of the module on the appropriate terminal of the circuit. Alternatively, the module may be temporarily attached to a tape which is subsequently laminated to the circuit.

A protective layer can be laminated over the module of a tape which holds the module in place while the adhesive is cured (partially or fully). The tape may held in place by a variety of adhesives including an adhesive selected from any of a number of adhesive types; hot melt, pressure sensitive, UV cure, thermoset etc. This laminate may cover the module fully or partially or it may be advantageous to use a segmented or multiple adhesives for specific uses.

A curing step can be done to set, such as cure, the conductive adhesive. This step may be of a type that initiates cure of the adhesive which proceeds after the circuit has been removed from the immediate vicinity of the attachment and/or curing station.

The protective layer can form a protective cover for the module, particularly if the laminate conforms closely to the shape of the module after lamination. There is no requirement for dwell time in the placement equipment. This means that parts with a partially cured adhesive can be safely rolled up and stored while the curing process takes place. This has the dual benefit of increasing process throughput and reducing material waste costs. Tape lamination equipment presently available can be modified to suit this application. The throughput of exiting equipment is sufficient to meet the imperative of a low cost high throughput process for placement and attachment of the module.

In alternate embodiments, a curable adhesive can be placed over the module contemporaneously with the conductive adhesive; an anisotropic adhesive can be used rather than traditional conductive adhesive; and/or an anisotropic adhesive can be used in place of both the traditional conductive adhesive and a laminating adhesive.

An alternate embodiment is a method for constructing a flexible circuit comprising attaching an integrated circuit chip to a substrate with an circuit traces using an adhesive; and laminating a protective layer over at least part of the integrated circuit chip while the adhesive has not yet fully set.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method comprising: laminating an antenna web with an adhesive, the antenna web including a Radio Frequency Identification (RFID) antenna on a first side of a substrate, the adhesive being laminated on a second side of the substrate;
    cutting the antenna web into individual segments for use in constructing an RFID label;
    further comprising attaching an RFID chip to the RFID antenna on a segment; and
    wherein the RFID chip is attached with an adhesive that is not fully set before a cover is placed on RFID chip.

2. The method of claim 1, wherein the cover is preprinted with variable data.

3. The method of claim 1, further comprising attaching a cover over the RFID chip on the segment.

4. The method of claim 3, wherein the cover includes printed indicia.

5. The method of claim 1, wherein the adhesive is attached to a release liner.

6. The method of claim 1, wherein the segments are die cut.

7. A method comprising: printing variable data on a protective cover;
    thereafter, attaching the protective cover over a unit that includes a substrate and a Radio Frequency Identification (RFID) antenna;
    further comprising:
        laminating an antenna web with an adhesive, the antenna web including a Radio Frequency Identification (RFID) antenna on a first side of a substrate, the adhesive being laminated on a second side of the substrate; and
    cutting the antenna web into individual segments for use in constructing an RFID label; and
    wherein the RFID chip is attached with an adhesive that is not fully set before cover is placed on RFID chip.

8. The method of claim 7, further comprising attaching an RFID chip to an antenna on a segment.

9. The method of claim 7, further comprising attaching a cover over the RFID chip on the segment.

10. The method of claim 9, wherein the cover includes printed indicia.

11. The method of claim 7, wherein the adhesive is attached to a release liner.

12. The method of claim 7, wherein the segments are die cut.

13. The method of claim 7, wherein the method is done by an RFID printer.

* * * * *